(12) United States Patent
Ogishi et al.

(10) Patent No.: US 9,322,477 B2
(45) Date of Patent: *Apr. 26, 2016

(54) VEHICLE TRANSMISSION OIL SEAL

(75) Inventors: Hidetaka Ogishi, Wako (JP); Tetsuya Mizone, Wako (JP); Kouhei Takemura, Settsu (JP); Tomihiko Yanagiguchi, Settsu (JP)

(73) Assignees: HONDA MOTOR CO., LTD., Tokyo (JP); DAIKIN INDUSTRIES, LTD., Osaka-Shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/575,216

(22) PCT Filed: Mar. 4, 2011

(86) PCT No.: PCT/JP2011/055116
§ 371 (c)(1),
(2), (4) Date: Jul. 25, 2012

(87) PCT Pub. No.: WO2011/111631
PCT Pub. Date: Sep. 15, 2011

(65) Prior Publication Data
US 2012/0299251 A1  Nov. 29, 2012

(30) Foreign Application Priority Data
Mar. 8, 2010 (JP) .................. 2010-051023

(51) Int. Cl.
*F16J 15/32* (2006.01)
*C09K 3/10* (2006.01)

(52) U.S. Cl.
CPC ........... *F16J 15/3284* (2013.01); *C09K 3/1009* (2013.01)

(58) Field of Classification Search
CPC ....... F16J 15/32; F16J 15/3244; F16J 15/328; F16J 15/3284

USPC .......................... 277/549, 559, 560, 582, 944
See application file for complete search history.

(56) References Cited

U.S. PATENT DOCUMENTS 4,526,388 A * 7/1985 Marshall ................. 277/565
5,269,539 A * 12/1993 Martin .................... 277/569
(Continued)

FOREIGN PATENT DOCUMENTS

CN  1464899 A  12/2003
CN  1688832 A  10/2005
(Continued)

OTHER PUBLICATIONS

Extended European Search Report. Application No. 11753290.3, dated Jul. 2, 2014.

*Primary Examiner* — Gilbert Lee
(74) *Attorney, Agent, or Firm* — Birch, Stewart, Kolasch & Birch, LLP

(57) ABSTRACT

The present invention provides a vehicle transmission having excellent sliding properties over the entire speed range of engines from a low speed range to a high speed range. The present invention is a vehicle transmission oil seal comprising: an elastic member with a seal lip portion having at least a main lip portion, wherein the elastic member is formed of a composition containing a fluororubber and a fluororesin and has projecting portions at least on a surface of the main lip portion, the projecting portions being substantially formed of the fluororesin contained in the composition, the fluororesin is a copolymer including a polymerization unit derived from ethylene and a polymerization unit derived from tetrafluoroethylene, and the fluororubber is a polymer including a polymerization unit derived from vinylidene fluoride.

12 Claims, 5 Drawing Sheets

(56) References Cited

U.S. PATENT DOCUMENTS

| | | | |
|---|---|---|---|
| 6,334,618 B1 * | 1/2002 | Ohta et al. | 277/549 |
| 6,676,132 B1 * | 1/2004 | Takebayashi et al. | 277/560 |
| 2002/0043770 A1 * | 4/2002 | Ohta et al. | 277/559 |
| 2005/0023767 A1 * | 2/2005 | Ohta et al. | 277/549 |
| 2006/0138729 A1 * | 6/2006 | Arai et al. | 277/559 |
| 2009/0011164 A1 | 1/2009 | Masuda et al. | |
| 2010/0181732 A1 * | 7/2010 | Broisin | F16J 15/3228 277/559 |

FOREIGN PATENT DOCUMENTS

| | | |
|---|---|---|
| CN | 101065440 A | 10/2007 |
| JP | 2000-320688 A | 11/2000 |
| JP | 2001-31795 A | 2/2001 |
| JP | 2003-49023 A | 2/2003 |
| JP | 2005-061454 A | 3/2005 |
| JP | 2005-180329 A | 7/2005 |
| JP | 2006-292160 A | 10/2006 |
| JP | 2010-14191 A | 1/2010 |
| JP | 2011-12212 A | 1/2011 |

* cited by examiner

VEHICLE TRANSMISSION OIL SEAL

TECHNICAL FIELD

The present invention relates to a vehicle transmission oil seal.

BACKGROUND ART

In automobile transmissions, automobile transmission oil seals are used to prevent leakage of fluids such as oil to the outside from edge portions of power shafts and output shafts which protrude from housings of the transmissions.

Various transmission oil seals have been proposed and examples thereof include a sealing member disclosed as an oil seal to be used in a transmission in Patent Document 1. The sealing member is formed of an elastomer such as nitrile rubber, acrylic rubber, silicone rubber, and fluororubber, and provided with a sealing lip.

Moreover, Patent Document 2 discloses a method for forming a fluororesin coating on the rubber surface with an aim of decreasing the sliding resistance of a seal lip portion in an oil seal.

In recent years, improvement in sliding properties of vehicle transmission oil seals is desired along with the demand for higher performance and better fuel economy of engines. For sure, a vehicle transmission oil seal formed of fluororubber or silicone rubber is likely to have better sliding properties compared to a vehicle transmission oil seal formed of acrylic rubber or nitrile rubber. The above-mentioned demand requires further improvement in sliding properties, especially, improvement in sliding properties over the entire speed running range from a low speed running range to a high speed running range.

Patent Document 1: JP 2005-61454 A
Patent Document 2: JP 2006-292160 A

SUMMARY OF THE INVENTION

Problems to be Solved by the Invention

The present invention is aimed to provide a vehicle transmission oil seal having excellent sliding properties over the entire speed running range from a low speed running range to a high speed running range.

Means to Solve the Problem

The present invention is a vehicle transmission oil seal comprising an elastic member with a seal lip portion having at least a main lip portion, wherein the elastic member is formed of a composition containing a fluororubber and a fluororesin and has projecting portions at least on a surface of the main lip portion, the projecting portions being substantially formed of the fluororesin contained in the composition; the fluororesin is a copolymer including a polymerization unit derived from ethylene and a polymerization unit derived from tetrafluoroethylene; and the fluororubber is a polymer including a polymerization unit derived from vinylidene fluoride.

Effect of the Invention

The vehicle transmission oil seal of the present invention comprises an elastic member with a seal lip portion having a main lip portion. The elastic member is formed of a specific compound and has projecting portions substantially formed of a fluororesin contained in the specific compound at least on the surface of the main lip portion. Therefore, the excellent sliding properties are achieved over the entire speed running range from a low speed running range to a high speed running range.

This effect is later described in detail.

BRIEF DESCRIPTIONS OF THE DRAWINGS

Figure 4:
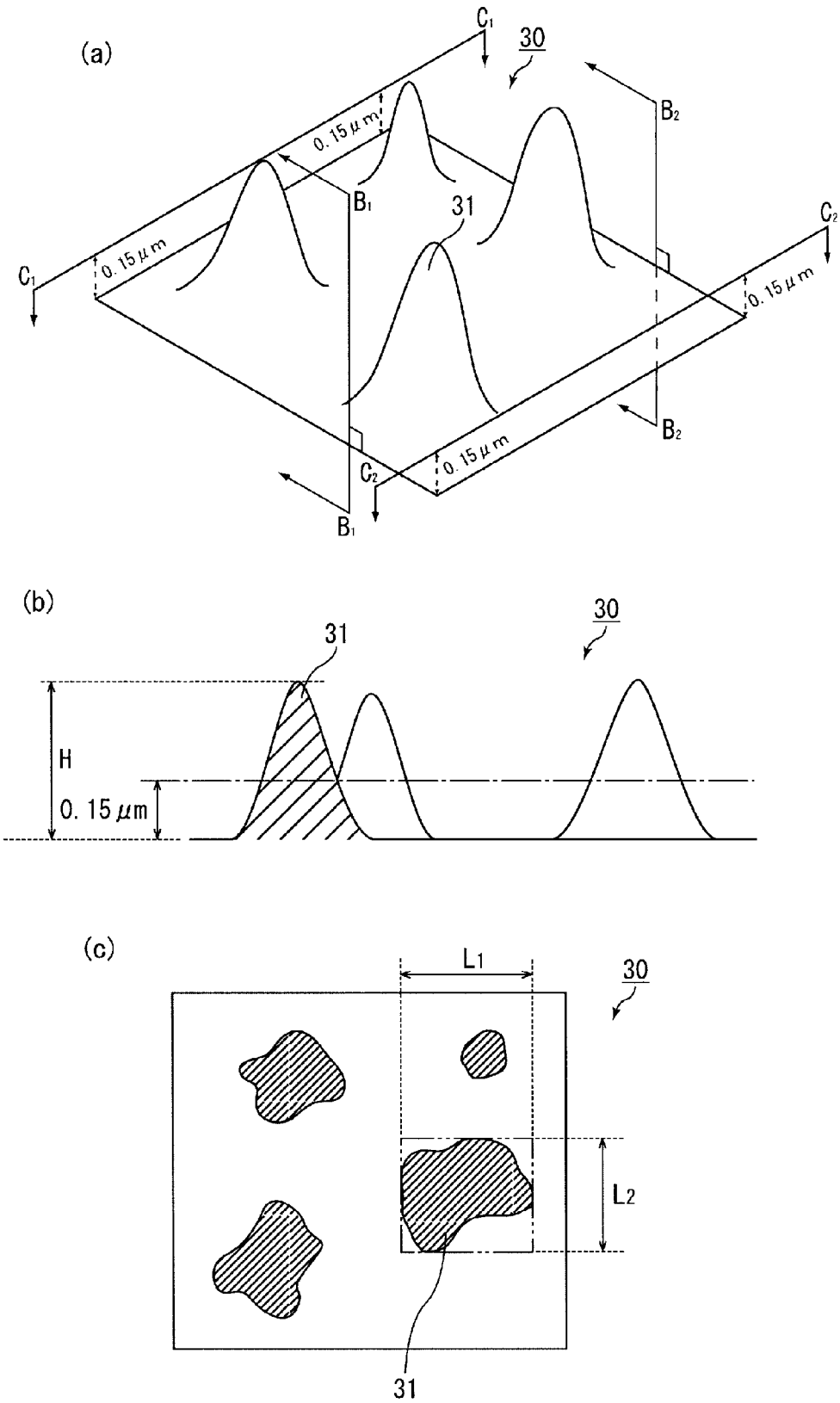

FIG. 4($a$) is a perspective view schematically illustrating shapes of the projecting portions of the seal lip portion. FIG. 4($b$) is a cross-sectional view of a projecting portion 31 cut along a plane including lines $B_1$ and $B_2$ that are perpendicular to the surface in FIG. 4($a$). FIG. 4($c$) is a cross-sectional view of the projecting portions cut along a plane including lines $C_1$ and $C_2$ that are drawn at a distance of 0.15 μm from the surface in FIG. 4($a$).

Figure 5:
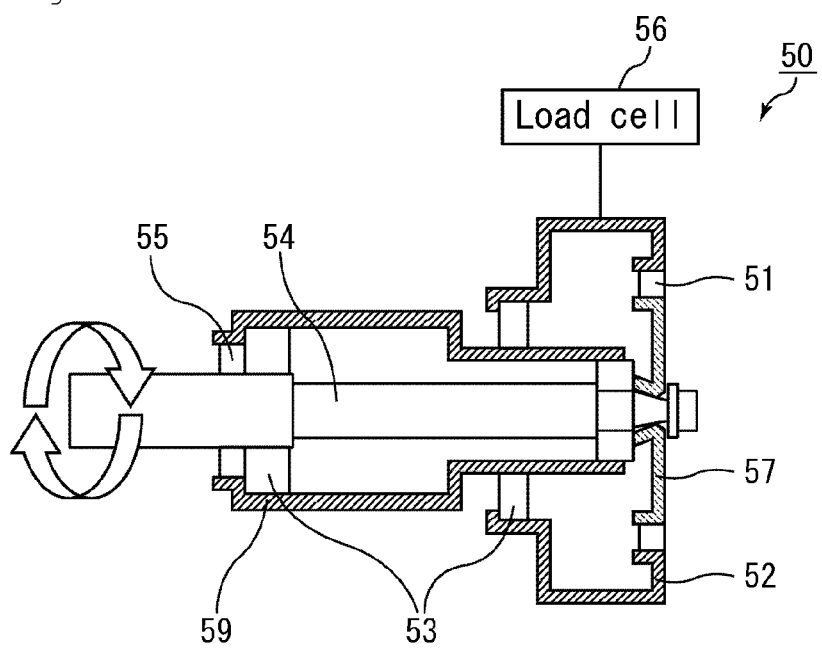

FIG. 5 is a schematic view of an oil seal torque tester used in examples.

MODES FOR CARRYING OUT THE INVENTION

The vehicle transmission oil seal of the present invention comprises an elastic member with a seal lip portion having at least a main lip portion, wherein the elastic member is formed of a composition containing a fluororubber and a fluororesin and has projecting portions at least on a surface of the main lip portion, the projecting portions being substantially formed of the fluororesin contained in the composition; the fluororesin is a copolymer including a polymerization unit derived from ethylene and a polymerization unit derived from tetrafluoroethylene; and the fluororubber is a polymer including a polymerization unit derived from vinylidene fluoride.

Hereinafter, a description is given on modes of the vehicle transmission oil seal of the present invention with reference to drawings.

Figure 1:
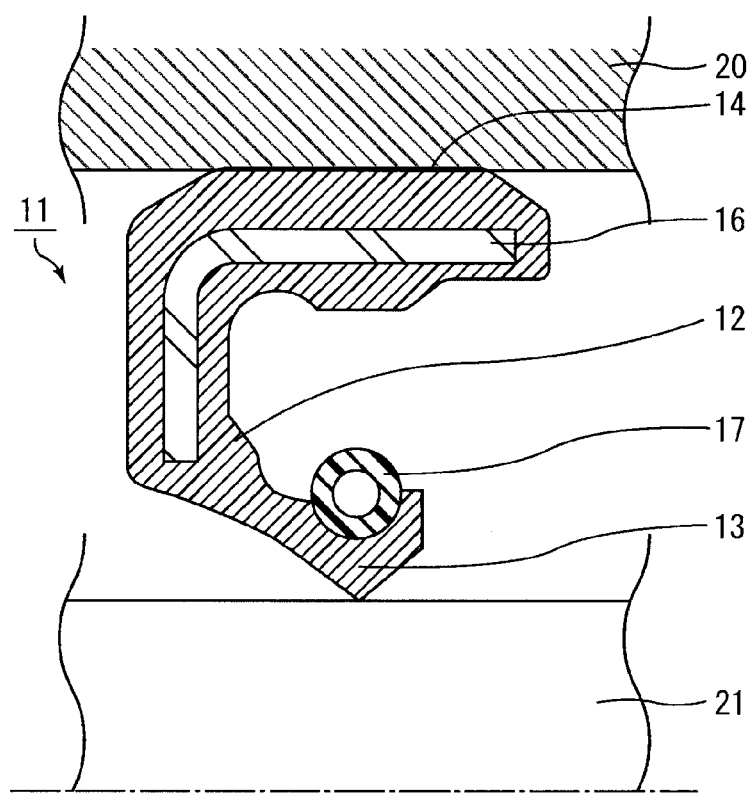
FIG. 1 is a cross-sectional view schematically illustrating a usage pattern of the vehicle transmission oil seal of the present invention and is an enlarged view of A region shown in FIG. 2.
Figure 2:
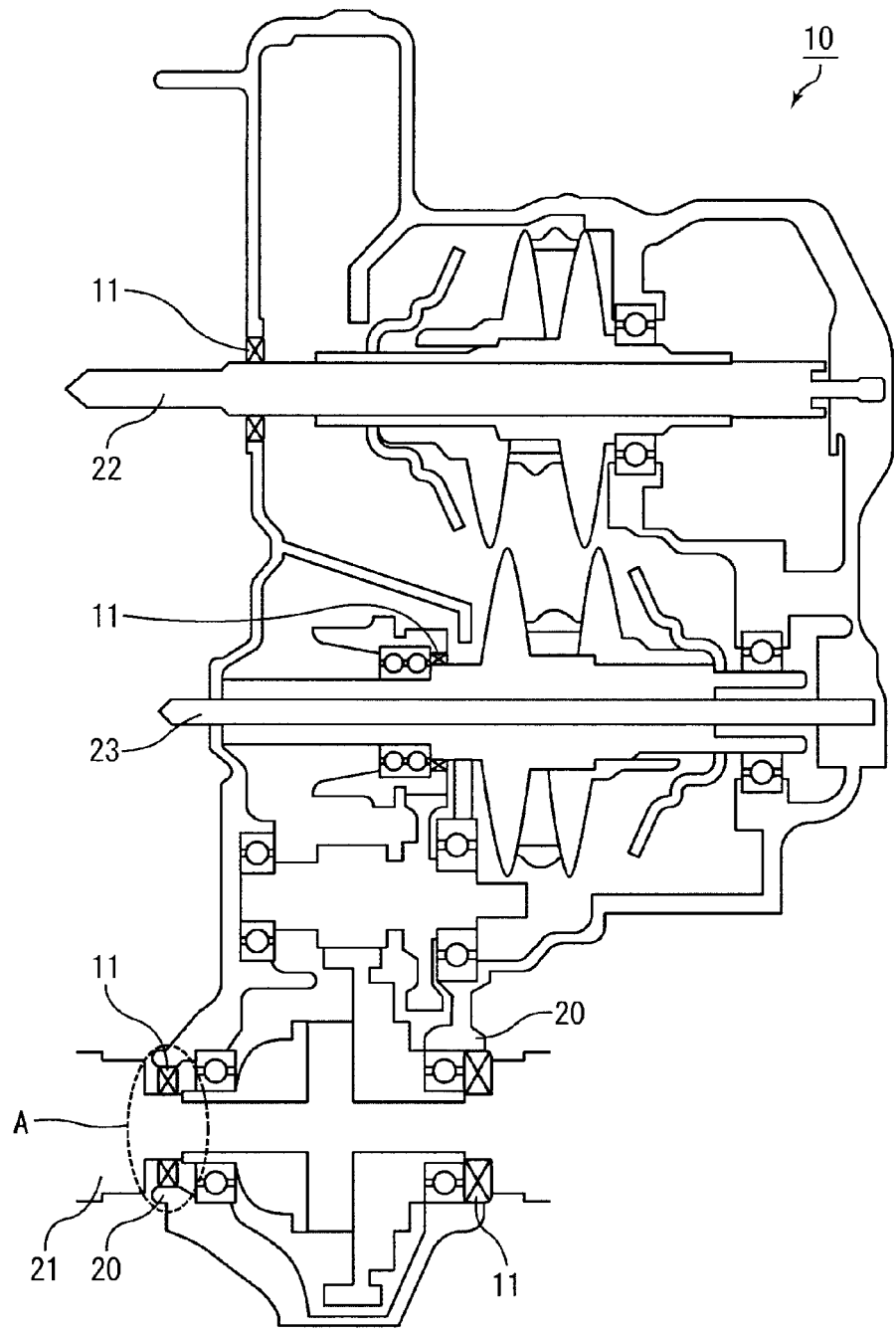
FIG. 2 is a cross-sectional view schematically illustrating a transmission in which the vehicle transmission oil seal of the present invention is used.
Figure 3:
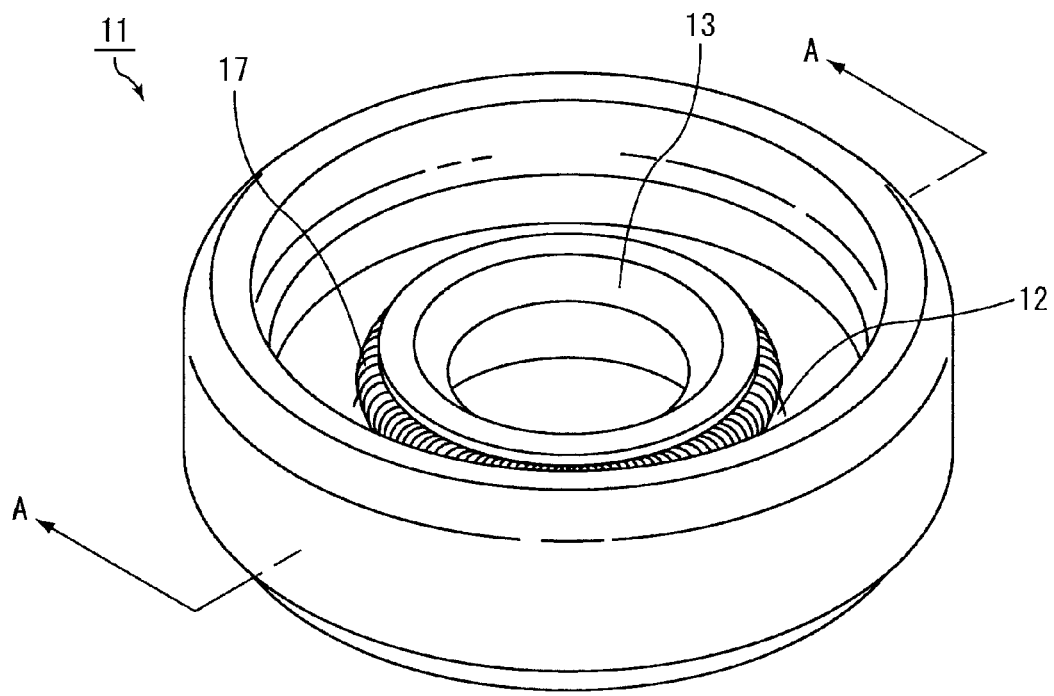
FIG. 3 is a perspective view of the vehicle transmission oil seal shown in FIG. 1.

FIG. 1 is a cross-sectional view schematically illustrating a usage pattern of the vehicle transmission oil seal of the present invention and is an enlarged view of A region shown in FIG. 2. FIG. 2 is a cross-sectional view schematically illustrating a transmission in which the vehicle transmission oil seal of the present invention is used. FIG. 3 is a perspective view of the vehicle transmission oil seal shown in FIG. 1. The vehicle transmission oil seal in FIG. 1 is an A-A line cross-sectional view of FIG. 3.

A vehicle transmission oil seal 11 of the present invention has, as illustrated in FIGS. 1 to 3, an annulus ring structure having a radial cross sectional shape of a U-shape rotated by 90° to the right (or left). Further, the vehicle transmission oil seal 11 comprises an elastic member 12 formed of a composition containing a fluororesin and a fluororubber, an annular metallic ring 16, and a ring spring 17.

The elastic member 12 has a seal lip portion including a main lip portion 13 that is in contact with an axle 21 on the inner periphery side and a fitting portion 14 tightly contacting with a housing 20 on the outer periphery side. The metallic ring 16 is contained in the elastic member 12, thereby reinforcing the vehicle transmission oil seal 11. The ring spring 17 is provided on the side of the outer peripheral surface of the main lip portion 13. The main lip portion 13 is made in contact with the axle 21 by the biasing force of the ring spring 17.

The vehicle transmission oil seal 11 is press-fit into a gap between the axle 21 and the housing 20 in such a manner that the main lip portion 13 is slidably in contact with the axle 21 of an transmission 10 in a manner that the ring spring 17 is exposed on the inner side of the transmission 10, and that the fitting portion 14 is tightly in contact with the housing 20. In FIG. 2, a main shaft (input shaft) coupled with the crankshaft is indicated by 22 and a counter shaft (output shaft) placed in parallel with the main shaft is indicated by 23.

Moreover, as illustrated in FIG. 2, the vehicle transmission oil seal 11 is slidably placed in contact not only with the axle 21 but also with the main shaft 22 and the counter shaft 23.

Here, in the vehicle transmission oil seal 11, the elastic member 12 is formed of a composition containing a fluororesin and a fluororubber, and projecting portions (see FIG. 4) are formed on the surface of the seal lip portion having the main lip portion 13. Namely, the vehicle transmission oil seal 11 has projecting portions in a part contacting with the axle 21.

Since the vehicle transmission oil seal 11 has the projecting portions, the coefficient of friction with shafts (axle, main shaft, counter shaft) is small and the excellent sliding properties are provided.

A word "shafts" herein includes an axle, a main shaft, and a counter shaft.

The effect of the excellent sliding properties is not affected by the speed of rotations of the shafts and is exerted over the entire range from the low rotation range to the high rotation range. A description is given thereon in more detail.

The material of the main lip portion 13 in the vehicle transmission oil seal 11 is a composition containing a fluororesin and a fluororubber. Therefore, better sliding properties are provided compared to the case of using another conventionally known material of the vehicle transmission oil seal, such as nitrile rubber, acrylic rubber, and fluororubber containing no fluororesin.

In addition, the vehicle transmission oil seal 11 has projecting portions formed of the composition.

It is known that oil intervenes (an oil film is formed) between a vehicle transmission oil seal and each shaft when the vehicle transmission oil seal slides around the shafts. The oil serves as a lubricant therebetween. Namely, the intervening oil allows the friction resistance to be low when the vehicle transmission oil seal slides.

Here, since the vehicle transmission oil seal must serve as a sealing material, its seal lip portion is made in contact with the shafts without any gaps. Accordingly, in order to allow oil to intervene between the vehicle transmission oil seal and each shaft in such a state, the seal lip portion needs to be deformed to allow the oil to follow the deformation to enter the gap between the seal lip portion and the shaft. The seal lip portion is deformed along with the rotations of the shaft, and therefore, the seal lip portion is easily deformed when the shafts rotate at a high rpm, so that oil easily enters the gap. In contrast, the seal lip portion is less easily deformed when the shafts rotate at a low rpm, compared to the case of rotations at a high rpm. As a result, oil is less likely to intervene between each shaft and the seal lip portion.

In the case that the shafts rotate at a low rpm, the sliding properties tend to be deteriorated compared to the case of rotations at a high rpm. Accordingly, in the vehicle transmission oil seal, improvement is desired in the sliding properties especially in the case that the shafts rotate at a low rpm.

In contrast, the vehicle transmission oil seal of the present invention has projecting portions on the surface of the seal lip portion as mentioned above. The vehicle transmission oil seal having such a configuration has microfine gaps between the seal lip portion and the shaft and is easily deformed along the rotations of the shafts, while securing the essential function of preventing leakage of oil to the outside of the transmission.

Consequently, the vehicle transmission oil seal of the present invention allows easy intervening of oil between the vehicle transmission oil seal and each shaft, and has excellent sliding properties over the entire rotation range of shafts from the low rotation range to the high rotation range, regardless of the speed of rotations of the shafts.

The projecting portions are substantially formed of the fluororesin contained in the composition. The fluororesin has significantly lower coefficient of friction compared to the fluororubber, and therefore, the projecting portions have a significantly lower friction resistance when in contact with the shaft, compared to those formed of the fluororubber. Such projecting portions are formed by precipitation of the fluororesin contained in the composition on the surface, for example, by a method described later.

Then, no obvious interfaces are formed between the projecting portions and the main body of the elastic member, and the elastic member 12 and the projecting portions are integrally formed. As a result, an effect that the projecting portions are hardly dropped or chipped when the shafts are rotated is more surely achieved.

Here, the fact that the projecting portions are substantially formed of the fluororesin contained in the composition is supported by the ratio between peaks derived from the fluororubber and the fluororesin. The peak ratio can be obtained by IR analysis or ESCA analysis. More specifically, the ratio between the characteristic absorption peak derived from the fluororubber and the characteristic absorption peak derived from the fluororesin (peak ratio of components=(peak intensity derived from the fluororubber)/(peak intensity derived from the fluororesin)) is determined by IR analysis, respectively for the projecting portions and for a part other than the projecting portions in the area having the projecting portions. In this case, the peak ratio derived from the components in the part other than the projecting portions is twice or more, and preferably three times or more of that of the projecting portions.

The shapes of the projecting portions are described in more detail with reference to the drawings.

FIG. 4(*a*) is a perspective view schematically illustrating the shapes of the projecting portions of the seal lip portion. FIG. 4(*b*) is a cross-sectional view of a projecting portion 31 cut along a plane including lines B1 and B2 that are perpendicular to the surface in FIG. 4(*a*). FIG. 4(*c*) is a cross-sectional view of the projecting portions cut along a plane including lines C1 and C2 that are drawn at a distance of 0.15 µm from the surface in FIG. 4(*a*).

FIGS. 4(*a*) to 4(*c*) each schematically illustrate a micro area of the seal lip portion 30 in the vehicle transmission oil seal of the present invention.

On the surface of the seal lip portion 30, as illustrated in FIGS. 4(*a*) to 4(*c*), the projecting portions 31 having a substantially conic shape are formed.

The height of the projecting portion 31 refers to a height of a portion protruding from the surface of the seal lip portion body (see H in FIG. 4(*b*)).

The diameter of the projecting portion 31 refers to a value obtained as follows. Namely, the projecting portion 31 is cut in parallel with the surface of the seal lip portion body at a predetermined height from the surface of the seal lip portion body (0.15 µm in the present description, see the alternate long and short dash line in FIG. 4(*b*)). In the cross section of the projecting portion 31 (see FIG. 4(c)), a minimum rectangle inscribed in the closed curve forming the outline of the cross section is assumedly drawn. The sum of the length of a long side L1 and the length of a short side L2 of the rectangle is divided by 2 and the resulting value ((L1+L2)/2) is the diameter of the projecting portion 31.

The average height of the projecting portions is preferably 0.5 to 5 μm.

The average height within that range allows the seal lip portion (main lip portion) to have especially excellent sliding properties.

The average height is more preferably 0.5 to 3 μm, and still more preferably 0.5 to 2 μm.

The average diameter of the projecting portions is preferably 5 to 20 μm, and more preferably 5 to 15 μm.

The average diameter of the projecting portions within that range allows the seal lip portion (main lip portion) to have especially excellent sliding properties.

On the surface of the main lip portion, the proportion of the area having the projecting portion is preferably not less than 10%. If the projecting portions are formed in at least 10% of the entire area, the low friction properties of the main lip portion are surely improved. The proportion is more preferably not less than 15%, and still more preferably not less than 18%.

On the other hand, the maximum proportion of the area having the projecting portion is preferably 80%.

Here, the proportion of the area having the projecting portion refers to the proportion of the area occupied by the projecting portions in the cross section used in the determination of the diameter of the projecting portion.

In the vehicle transmission oil seal of the present invention, the projecting portions may be formed at least on the surface of the main lip portion. Moreover, the projecting portions may be formed only on the surface of the main lip portion, only on the surface of the seal lip portion, or on the entire surface of the elastic member.

Namely, in the vehicle transmission oil seal of the present invention, the projecting portions may be formed at least on the portions contacting with the shafts.

The shapes of the projecting portions can be observed using an atomic force microscope. For example, the surface of the seal lip portion in the vehicle transmission oil seal is observed using an atomic force microscope. A phase image obtained in the observation is used for analysis of the surface hardness which enables to determine the presence of the projecting portions substantially formed of the fluororesin. The average diameter of the projecting portions on the surface of the seal lip portion is, for example, the average diameter in 100 measurement fields of view. The average diameter in a measurement field of view is obtained as follows. Namely, all the projecting portions in the measurement field of view (100 μm square) are cut at a height of 0.15 μm. The sum of the length and the width of the cross section of each projecting portion is divided by 2. Then, the obtained values are averaged.

The average height of the projecting portions is, for example, the average height in 100 measurement fields of view. The average height in a measurement field of view is obtained by averaging the values of the heights of all the projecting portions in the measurement field of view (100 μm square).

The proportion of the area having the projecting portions is, for example, the average of the occupancy rates in 100 measurement fields of view. The occupancy rate in a measurement field of view is a proportion of the area occupied by the area of the projecting portions cut at a height of 0.15 μm to the measurement field of view (100 μm square).

Atomic force microscope: PM920-006-101 Multimode V system, Veeco Instruments Inc.)
Cantilever: HMX-10 (VEECO Probes)
Measurement environment: ambient temperature and humidity
Measurement field: 100 μm square
Measurement mode: harmonics mode The shapes of the projecting portions may also be determined using a laser microscope. For example, with use of a laser microscope and analysis software mentioned below, the diameter of the bottom cross section and the height of each projecting portion are determined with respect to all the projecting portions present in any part (270 μm×202 μm) of the surface of the seal lip portion. The averages of the obtained values are the average diameter and the average height. Moreover, the sum of the cross sectional area of the projecting portions present in any part (270 μm×202 μm) of the surface of the seal lip portion may be used to determine the occupancy rate of the projecting portions in the area of the measurement field.

Laser microscope: color 3D laser microscope (VK-9700, KEYENCE CORPORATION)
Analysis software: WinRoof Ver. 6.4.0 (MITANI CORPORATION)
Measurement environment: ambient temperature and humidity
Measurement field: 270 μm×202 μm Here, the shape of the entire vehicle transmission oil seal of the present invention is not limited to the shape illustrated in FIGS. 1 and 3. The shape may be appropriately selected in accordance with the engine design. Accordingly, the shape of the seal lip portion in the vehicle transmission oil seal is not limited to the shape in the drawings, and may have a sub lip portion.

The vehicle transmission oil seal comprises at least an elastic member having a seal lip portion. A metallic ring and a ring spring may not be necessarily provided therein in accordance with the design of the vehicle transmission oil seal.

The elastic member in the vehicle transmission oil seal of the present invention is formed of a composition containing a fluororubber and a fluororesin.

The composition preferably has a mass ratio of the fluororubber and the fluororesin (fluororubber/fluororesin) of 60/40 to 97/3. If the amount of the fluororesin is too small, the effect of decreasing the coefficient of friction may not be well achieved. On the other hand, if the amount of the fluororesin is too large, the rubber elasticity is significantly lowered so that the primary function of sealing oil is impaired, possibly resulting in the case where oil leaks. Since both the flexibility and low friction properties are favorably obtained, the mass ratio (fluororubber/fluororesin) is more preferably 65/35 to 95/5, and still more preferably 70/30 to 90/10.

The fluororubber comprises rubber-elastomeric amorphous polymers having fluorine atoms bonded to carbon atoms that constitutes a main chain. The fluororubber may comprise one kind of polymers or two or more kinds of polymers.

The fluororubber is polymers containing a polymerization unit (VdF unit) derived from vinylidenefluoride (VdF).

The fluororubber is preferably a copolymer containing a VdF unit and a polymerization unit (other than VdF unit) derived from a fluorine-containing ethylene monomer. Preferably, the copolymer containing a VdF unit further contains a copolymerization unit (other than a VdF unit and copolymerization units derived from a fluorine-containing ethylene monomer) derived from a monomer copolymerizable with VdF and a fluorine-containing ethylene monomer.

The fluororubber preferably contains 30 to 85 mol % of VdF units and 70 to 15 mol % of copolymerization units derived from fluorine-containing ethylene monomers, and more preferably 30 to 80 mol % of VdF units and 70 to 20 mol % of copolymerization units derived from fluorine-containing ethylene monomers. The amount of the copolymerization unit derived from a monomer copolymerizable with VdF and fluorine-containing ethylene monomers is preferably 0 to 10 mol % relative to the total amount of the VdF unit and the copolymerization unit derived from fluorine-containing ethylene monomers.

Examples of the fluorine-containing ethylene monomers include fluorine-containing monomers such as tetrafluoroethylene (TFE), chlorotrifluoroethylene (CTFE), trifluoroethylene, hexafluoropropylene (HFP), trifluoropropylene, tetrafluoropropylene, pentafluoropropylene, trifluorobutene, tetrafluoroisobutene, perfluoro(alkyl vinyl ether) (PAVE), and vinyl fluoride. In particular, the fluorine-containing ethylene monomer is preferably at least one selected from the group consisting of TFE, HFP, and PAVE.

The PAVE is more preferably perfluoro(methyl vinyl ether), perfluoro(ethyl vinyl ether), or perfluoro(propyl vinyl ether), and still more preferably perfluoro (methyl vinyl ether). Each of these may be used alone, or in combination with any of these.

Examples of the monomer copolymerizable with VdF and a fluorine-containing ethylene monomer include ethylene, propylene, and alkyl vinyl ether.

The fluororubber is preferably a copolymer selected from the group consisting of a VDF/HFP copolymer, a VdF/HFP/TFE copolymer, a VdF/CTFE copolymer, a VdF/CTFE/TFE copolymer, a VdF/PAVE copolymer, a VdF/TFE/PAVE copolymer, a VdF/HFP/PAVE copolymer, and a VdF/HFP/TFE/PAVE copolymer. In consideration of the thermal resistance, compression set, processability, and cost, at least one copolymer selected from the group consisting of a VdF/HFP copolymer and a VdF/HFP/TFE copolymer is more preferable.

The fluororubber preferably has a Mooney viscosity ($ML_{1+10}$(121° C.)) of 5 to 140, more preferably 10 to 120, and still more preferably 20 to 100, because such a fluororubber has favorable processability.

The fluororubber to be used preferably has a number average molecular weight of 20,000 to 1,200,000, more preferably 30,000 to 300,000, and still more preferably 50,000 to 200,000. The number average molecular weight may be determined by GPC using a solvent such as tetrahydrofuran and n-methyl pyrrolidone.

The crosslinking system of the fluororubber may be selected in accordance with the applications. Examples of the crosslinking system include peroxide crosslinking systems, polyol crosslinking systems, and polyamine crosslinking systems.

The fluororesin is a copolymer (ETFE) containing a polymerization unit (Et unit) derived from ethylene and a polymerization unit (TFE unit) derived from tetrafluoroethylene.

The molar ratio of the TFE unit and Et unit is preferably 20:80 to 90:10, more preferably 37:63 to 85:15, and particularly preferably 38:62 to 80:20.

The ETFE may contain a polymerization unit derived from a monomer copolymerizable with TFE and ethylene. Examples of the copolymerizable monomer include fluoromonomers such as CTFE, trifluoroethylene, HFP, trifluoropropylene, tetrafluoropropylene, pentafluoropropylene, trifluorobutene, tetrafluoroisobutene, perfluoro(alkyl vinyl ether), vinyl fluoride, 2,3,3,4,4,5,5-heptafluoro-1-pentene ($CH_2$=$CFCF_2CF_2CF_2H$). In particular, HFP is preferable. The monomer copolymerizable with TFE and ethylene may be an aliphatic unsaturated carboxylic acid such as itaconic acid and itaconic anhydride.

The amount of the polymerization unit derived from a monomer copolymerizable with TFE and ethylene is preferably 0.1 to 5 mol %, and more preferably 0.2 to 4 mol % relative to the total amount of the monomer units.

The ETFE preferably has a melting point of 120° C. to 340° C., more preferably 150° C. to 320° C., and still more preferably 170° C. to 300° C.

If necessary, the composition may contain compounding agents commonly used in fluororubbers, including various additives such as fillers, processing aids, plasticizers, colorants, stabilizers, adhesives, mold release agents, electric conductivity imparting agents, thermal conductivity imparting agents, surface non-adhesive agents, flexibility imparting agents, heat resistance improvers, and flame retardants, to the extent that the effects of the present invention are not deteriorated.

The metallic ring and the ring spring in the vehicle transmission oil seal may be conventionally known ones.

Next, a description is given on a method for producing the vehicle transmission oil seal of the present invention.

The vehicle transmission oil seal of the present invention is produced as follows. First, an elastic member having a predetermined shape is produced by a method comprising the steps of:

(I) kneading a fluororesin and an uncrosslinked fluororubber at least at a temperature 5° C. lower than the melting point of the fluororesin;

(II) molding and crosslinking the obtained kneaded mass; and (III) heating the resulting crosslinked molding to a temperature higher than the melting point of the fluororesin. Then, if needed, a metallic ring is built into the elastic member and a ring spring is placed to produce a vehicle transmission oil seal.

The uncrosslinked fluororubber refers to a fluororubber before the crosslinking treatment.

(I) Kneading Step

In the kneading step (I), an uncrosslinked fluororubber and a fluororesin are melt-kneaded at least at a temperature 5° C. lower than the melting point of the fluororesin, and preferably at a temperature not lower than the melting point. The upper limit of the heating temperature is a temperature lower than the heat decomposition temperature of the fluororubber or the fluororesin (whichever is lower).

The melt-kneading of the uncrosslinked fluororubber and the fluororesin is not conducted under the conditions which may cause crosslinking at that temperature (e.g. presence of a crosslinking agent, crosslinking accelerator, and acid acceptor). The components may be added in the melt-kneading step, provided that they do not cause crosslinking at the melt-kneading temperature that is at least at a temperature 5° C. lower than the melting point of the fluororesin (e.g. a specific crosslinking agent only, a specific combination of a crosslinking agent and a crosslinking accelerator only). Examples of the conditions causing the crosslinking include a combination of a polyol crosslinking agent, a crosslinking accelerator, and an acid acceptor.

Accordingly, in the kneading step (I) in the present invention, a two-phase kneading method is preferable in which an uncrosslinked fluororubber and a fluororesin are melt-kneaded to give a pre-compound (pre-mixture) and then the pre-compound is kneaded with other additives and compounding agents at a temperature lower than the crosslinking temperature to give a full-compound. Obviously, all the ingredients may be kneaded together at a temperature lower than the crosslinking temperature of the crosslinking agent.

The crosslinking agent to be used may be a known crosslinking agent such as an amine crosslinking agent, a polyol crosslinking agent, and a peroxide crosslinking agent.

In the melt-kneading treatment, the fluororesin is kneaded with the fluororubber using a Banbury mixer, pressure kneader, extruder, or the like at least at a temperature 5° C. lower than the melting point of the fluororesin, for example, at 200° C. or higher, commonly at 230° C. to 290° C. In particular, a pressure kneader or an extruder such as a biaxial extruder is preferably used because a high shearing force can be applied.

The full-compounding step in the two-phase kneading method may be conducted using an open roll mill, Banbury mixer, pressure kneader or the like at a temperature lower than the crosslinking temperature, for example, at a temperature not higher than 100° C.

Here, an exemplary treatment (dynamic crosslinking) similar to the melt-kneading treatment is crosslinking of the uncrosslinked fluororubber in the fluororesin under the melt conditions of the fluororesin. In the dynamic crosslinking, an uncrosslinked rubber is blended in a matrix of a thermoplastic resin and is crosslinked with kneading. The crosslinked rubber is dispersed in the matrix at the micro level. The melt-kneading treatment in the present invention is essentially different from the above treatment in that the treatment is conducted under the conditions that do not cause crosslinking (e.g. absence of the component needed for crosslinking, formulation that does not cause crosslinking at that temperature), and the matrix is formed of an uncrosslinked rubber so as to provide a mixture in which the fluororesin is dispersed in the uncrosslinked rubber.

(II) Molding and Crosslinking Step

In this step, the kneaded mass obtained in the kneading step is molded and crosslinked to provide a crosslinked molding having a shape substantially identical to the elastic member to be produced.

Examples of the molding method include, but not limited to, pressure molding and injection molding using a mold.

The crosslinking method employed may be steam crosslinking, pressure molding, a common method in which a crosslinking reaction is induced by heating, or irradiation crosslinking. In particular, a crosslinking reaction induced by heating is preferable.

Methods and conditions for molding and crosslinking may be within the range of those common in the employed methods of molding and crosslinking. The molding and the crosslinking may be conducted in any order, and may also be conducted simultaneously.

As the nonlimitative specific crosslinking conditions, the conditions may be appropriately determined in accordance with the crosslinking agent to be used, commonly within the temperature range of 150° C. to 300° C. and the crosslinking time of 1 minute to 24 hours. In consideration of formation of the projecting portions formed of the fluororesin on the surface of the crosslinked molding in the heat treatment described later, the conditions for molding and crosslinking are preferably a temperature lower than the melting point of the fluororesin, and more preferably a temperature at least 5° C. lower than the melting point of the fluororesin. The lower limit of the temperature in the crosslinking conditions is the crosslinking temperature of the fluororubber.

In the crosslinking of the uncrosslinked rubber, a post treatment called secondary crosslinking may be conducted after the first crosslinking treatment (primary crosslinking). The molding and crosslinking step (II) and the heating step (III) are different from the conventional secondary crosslinking, as described in the following description of the heating step (III).

In the case of producing the vehicle transmission oil seal containing a metallic ring, a metallic ring may be preliminary placed in the mold so that integral molding is conducted in this step.

(III) Heating Step

In the heating step (III), the obtained crosslinked molding is heated to a temperature higher than the melting point of the fluororesin. In the heating step (III), projecting portions (mainly formed of the fluororesin) are formed on the surface of the elastic member to be produced.

The heating step (III) in the present invention is conducted for increasing the proportion of the fluororesin on the surface of the crosslinked molding. In consideration of this purpose, the heating step (III) is conducted at a temperature that is higher than the melting point of the fluororesin and lower than the heat decomposition temperatures of the fluororubber and the fluororesin.

If the heating temperature is lower than the melting point of the fluororesin, the proportion of the fluororesin on the surface of the crosslinked molding is not increased sufficiently. To avoid heat decomposition of the fluororubber and the fluororesin, the heating temperature needs to be lower than the heat decomposition temperature of the fluororubber or the fluororesin (whichever is lower). The preferable heating temperature is a temperature at least 5° C. higher than the melting point of the fluororesin because low friction properties are easily achieved in a short time.

The heating time and the heating temperature are closely related to each other. If the heating temperature is comparatively approaching the lower limit, heating is conducted for a comparatively long time. If the heating temperature is comparatively approaching the upper limit, the preferable heating time is comparatively short. As above, the heating time may be appropriately determined in consideration of the relation with the heating temperature. However, a heating treatment at an extremely high temperature may cause heat degradation of the fluororubber. Therefore, the practical heating temperature is up to 300° C.

Formation of the projecting portions (mainly formed of the fluororesin) on the surface of the elastic member in the heating step (III) was first found out by the present inventors.

The elastic member produced in the steps (I) to (III) has the projecting portions on its entire surface. However, in the vehicle transmission oil seal of the present invention, projecting portions may be formed at least on the surface of the seal lip portion and no projecting portions may be present on the portion other than the surface of the seal lip portion. In the case of producing such an elastic member, the projecting portions in the unwanted part may be removed by grinding or the like after the step (III).

Here, conventional secondary crosslinking is a treatment for finishing the crossliking of the fluororubber by completely decomposing the residual crosslinking agent after the primary crosslinking, thereby improving the mechanical properties and compression set properties of the crosslinked molding.

Accordingly, in the conventional secondary crosslinking in which coexistence with the fluororesin is not considered, the heating conditions are determined only to the extent of the purpose of finishing the crosslinking of the uncrosslinked fluororubber (complete decomposition of the crosslinking agent) without consideration of the existence of the fluororesin as one element for setting the crosslinking conditions, even in the case that the crosslinking conditions of the uncrosslinked fluororubber are accidentally satisfied in the heating conditions in the heating step. Therefore, the conditions for softening or melting the fluororesin by heating in crosslinked rubber (not uncrosslinked rubber) in the case of blending the fluororesin cannot be always arrived at In the molding and crosslinking step (II), secondary crosslinking may be conducted for finishing the crosslinking of the uncrosslinked fluororubber (for completely decomposing the crosslinking agent).

There may be a case where the residual crosslinking agent is decomposed in the heating step (III), so that the crosslinking of the uncrosslinked fluororubber is finished. However, such crosslinking of the uncrosslinked fluororubber in the heating step (III) is only a side effect.

If necessary, a step for providing a ring spring may be conducted after the heating step (III).

In the vehicle transmission oil seal obtainable by a method comprising the steps of the kneading step (I), the molding and crosslinking step (II), and the heating step (III), presumably, the projecting portions are formed on the surface of the elastic member owing to a surface migration of the fluororesin, and the proportion of the fluororesin is increased in the surface region (including of the convex-portion part).

In particular, the kneaded mass obtained in the kneading step (I) presumably has a structure in which the uncrosslinked fluororubber forms a continuous phase and the fluororesin forms a dispersed phase, or both the uncrosslinked fluororubber and the fluororesin form a continuous phase. Such a structure allows a smooth crosslinking reaction in the molding and crosslinking step (II) so that the resulting crosslinked product is uniformly crosslinked. Moreover, surface migration of the fluororesins smoothly occurs in the heating step (III), resulting in the surface with increased proportion of the fluororesin.

In the heating step, heating at a temperature higher than the melting point of the fluororesin is particularly favorable because migration of the fluororesin to the surface layer smoothly occurs.

The state where the surface region of the vehicle transmission oil seal has an increased proportion of the fluororesin can be verified by chemical analysis (ESCA or IR analysis) of the surface of the elastic member.

For example, ESCA analysis enables identification of the atomic group from the surface to the depth of about 10 nm of the moldings. Here, after the heating, the ratio ($P_{ESCA}1/P_{ESCA}2$) of a peak of binding energy derived from the fluororubber ($P_{ESCA}1$) and a peak derived from the fluororesin ($P_{ESCA}2$) is reduced compared to the ratio before the heating. Namely, the atomic group of the fluororesin is increased.

IR analysis enables identification of the atomic group from the depth (from the surface) of about 0.5 μm to the depth of about 1.2 μm from the surface of the moldings. Here, after the heating, the ratio ($P_{IR0.5}1/P_{IR0.5}2$) of a characteristic absorption peak derived from the fluororubber at the depth of 0.5 μm ($P_{IR0.5}1$) and a peak derived from the fluororesin at the depth of 0.5 μm ($P_{IR0.5}2$) is decreased compared to the ratio before the heating. Namely, the atomic group of the fluororesin is increased. In comparison of the ratios at the depth of 0.5 μm ($P_{IR0.5}1/P_{IR0.5}2$) and at the depth of 1.2 μm ($P_{IR1.2}1/P_{IR1.2}2$), the ratio at the depth of 0.5 μm ($P_{IR0.5}1/P_{IR0.5}2$) is smaller. This indicates that the proportion of the fluororesin is increased in the region closer to the surface.

In an automobile engine seal in which the surface of a fluororubber is modified by application or bonding of a fluororesin, projecting portions that are the feature of the vehicle transmission oil seal of the present invention are not found on the surface. Accordingly, the vehicle transmission oil seal having projecting portions formed by deposition of the fluororesin in the composition on the surface as in the present invention is a novel vehicle transmission oil seal.

Formation of the projecting portions on the surface of the elastic member in the heating step (III) significantly improves, for example, low friction properties and water/oil repellency, among the properties of the elastic member, compared to those subjected to no heating treatment. Moreover, in the part other than the surface, the properties of the fluororubber are exerted. As a whole, the elastic member is allowed to have excellent low friction properties, water/oil repellency, and elastomeric properties in a balanced manner. Accordingly, the vehicle transmission oil seal provided with this elastic member has excellent low friction properties, water/oil repellency, and elastomeric properties in a balanced manner, wherein those properties are required properties of the vehicle transmission oil seal. Moreover, no obvious interface is formed between the fluororesin and the fluororubber, projecting portions on the surface do not drop off. Such a vehicle transmission oil seal is excellent in the durability and reliability.

EXAMPLES

The present invention is described with reference to, but not limited to, examples.
Fluororubber: polyol-crosslinkable binary fluororubber (G7401, DAIKIN INDUSTRIES, ltd.)
Fluororesin: ETFE (EP-610, DAIKIN INDUSTRIES, ltd.)
Filler: Carbon black (N990 (MT carbon), Cancarb)
Acid acceptor: magnesium oxide (MA150, Kyowa Chemical Industry Co., Ltd.)
Crosslinking aid: calcium hydrate (CALDIC2000, Ohmi Chemical Industry Co., LTD.)
Metallic ring: cold rolled steel plate SPCC
Ring spring: hard steel wire SWB Example 1

(I) Kneading Step
(Preparation of Pre-Compound)

A 3-L pressure kneader was charged with a fluororubber (100 parts by mass) and a fluororesin (43 parts by mass) in a manner such that the volume load was 85%. The mixture was kneaded until the temperature of the materials (the fluororubber and the fluororesin) reached 230° C. to give a pre-compound. The rotational speed of the rotor was set to 45 rpm.

(Preparation of Full-Compound)

The resulting pre-compound was wound around two 8-inch rolls in an open roll mill. Filler (1 part by mass), an acid acceptor (3 parts by mass), and a crosslinking aid (6 parts by mass) were added thereto and the mixture was kneaded for 20 minutes. The resulting full-compound was cooled down for 24 hours and again kneaded using an open roll mill having two 8-inch rolls at 30° C. to 80° C. for 20 minutes. In this manner, the full-compound was prepared.

The crosslinking (vulcanization) properties of the full-compound were tested. Table 1 shows the results.

(II) Molding and Crosslinking Step

A metallic ring was placed in the mold of the vehicle transmission oil seal and the full compound was charged into the mold. The full-compound was pressurized at a load of 8

MPa and vulcanized at 180° C. for 5 minutes. As a result, a crosslinked molding (adaptive diameter: 80 mm, external diameter: 98 mm, width: 8 mm) was produced.

(III) Heating Step

The obtained crosslinked molding was placed in a furnace maintained at 230° C. for 24 hours for the heating treatment. In this manner, a vehicle transmission oil seal having a configuration as illustrated in FIG. 3 was produced.

The crosslinking (vulcanization) properties were tested using a Curelastometer (JSR-II) at a measurement temperature of 170° C.

The surface of the seal lip portion in the vehicle transmission oil seal was observed using an atomic force microscope. The surface hardness was determined based on the phase image, and the presence of the projecting portions substantially formed of the fluororesin was confirmed.

The average diameter of the projecting portions on the surface of the seal lip portion in the oil seal is the average diameter in 100 measurement fields of view. The average diameter in a measurement field of view is obtained as follows. Namely, all the projecting portions in the measurement field of view (100 μm square) are cut at a height of 0.15 μm. The sum of the length and the width of the cross section of each projecting portion is divided by 2. Then, the obtained values are averaged.

The average height of the projecting portions is the average height in 100 measurement fields of view. The average height in a measurement field of view is obtained by averaging the values of the heights of all the projecting portions in the measurement field of view (100 μm square).

The proportion of the area having the projecting portions is, for example, the average of the occupancy rates in 100 measurement fields of view. The occupancy rate in the measurement field of view is a proportion of the area occupied by the area of the projecting portions cut at a height of 0.15 μm in the field of the measurement vision (100 μm square).

Atomic force microscope: PM920-006-101 Multimode V system, Veeco Instruments Inc.
Cantilever: HMX-10 (VEECO Probes)
Measurement environment: ambient temperature and humidity
Measurement field: 100 μm square
Measurement mode: harmonics mode Table 1 shows the identification results of the atomic groups at a depth of 0.5 μm from the top of the projecting portion on the surface of the seal lip portion in the oil seal and at a depth of 0.5 μm from the surface of the portion other than the projecting portions by IR analysis. Here, the characteristic absorption peak derived from the fluororubber is referred to as ($P_{IR0.5}1$) and the characteristic absorption peak derived from the fluororesin is referred to as ($P_{IR0.5}2$). The ratio thereof ($P_{IR0.5}1/P_{IR0.5}2$) is shown in table 1.

The projecting portions refer to portions having a height of 0.15 μm or higher.

The rotating torque of the vehicle transmission oil seal was measured by the following method. Table 1 shows the results.

FIG. 5 is a schematic view of an oil seal torque tester used in examples.

In the oil seal torque tester 50 shown in FIG. 5, a shaft 54 was rotatably provided in a housing 59 via a bearing 53. On the distal side of the shaft 54 (right side in FIG. 5), an oil chamber 52 was provided, as well as an oil seal holding member 57. The transmission oil seal 51 for measurement was slidably fixed to the oil seal holding member 57 in the gap between the housing 52 and the oil seal holding member 57. Moreover, a load cell was connected to the housing 52. In FIG. 5, an oil seal is indicated by 55.

With the transmission oil seal 51 for measurement set, the temperature of the oil chamber (oil temperature) was set to a predetermined temperature and the shaft 54 was rotated by a motor (not shown) at a predetermined rotation speed. Then, the oil seal holding member 57 was rotated in conjunction with the shaft 54 and slid along the transmission oil seal 51 for measurement. The load applied to the transmission oil seal 51 for measurement at this time was measured by the load cell 56. The measured load was multiplied by the radius of rotation and converted to torque.

Here, the measurement conditions are the oil temperature (test temperature) of room temperature and the rotation speed of the shaft 54 of 2000 rpm or 5000 rpm.

Examples 2 and 3

Vehicle transmission oil seals were produced in the same manner as in Example 1, except that the amount of fluororesin was changed as shown in Table 1. The rotating torque of the obtained oil seals was measured. Table 1 shows the results.

Comparative Example 1

The rotation torque of a commercially-available fluororubber oil seal (for HONDA cars, part No. 91214-RTA-0030) was measured. Table 1 shows the results.

TABLE 1

|  | Example 1 | Example 2 | Example 3 | Comparative Example 1 |
|---|---|---|---|---|
| Crosslinkable fluororubber composition (parts by mass) | | | | |
| Fluororubber | 100 | 100 | 100 | — |
| Fluororesin | 43 | 38 | 33 | — |
| Filler | 1 | 1 | 1 | — |
| Acid acceptor | 3 | 3 | 3 | — |
| Crosslinking aid | 6 | 6 | 6 | — |
| Kneading condition (temperature × time) | | | | |
| Pre-compound | 230° C. × 30 min. | 230° C. × 30 min. | 230° C. × 30 min. | — |
| Crosslinking (vulcanization) properties | | | | |
| Minimum torque ML (N) | 2.7 | 2.6 | 2.5 | — |
| Maximum torque MH (N) | 38.2 | 36.3 | 34.5 | — |
| Induction time T10 (minutes) | 4.4 | 4.2 | 4.1 | — |
| Optimul vulcanization time T90 (minutes) | 6.7 | 6.5 | 6.3 | — |

TABLE 1-continued

|  | Example 1 | Example 2 | Example 3 | Comparative Example 1 |
|---|---|---|---|---|
| Surface of seal lip portion |  |  |  |  |
| Average height of projecting portion (nm) | 1443.7 | 618.8 | 621.0 | 0 |
| Average diameter of projecting portion (μm) | 11.78 | 7.94 | 6.80 | 0 |
| Occupancy rate of projecting portion (%) | 19.8 | 19.1 | 17.1 | 0 |
| Ratio of characteristic absorption peak derived from fluororubber and characteristic absorption peak derived from fluororesin |  |  |  |  |
| Projecting portion part ($P_{IR0.5}1/P_{IR0.5}2$) | 0.12 | 0.16 | 0.21 | — |
| Part other than projecting portion ($P_{IR0.5}1/P_{IR0.5}2$) | 0.86 | 0.85 | 0.87 | — |
| Rotating torque (N · cm) |  |  |  |  |
| 2000 rpm | 26.2 | 24.1 | 27.5 | 30.4 |
| 5000 rpm | 29.2 | 27.7 | 30.9 | 36.5 |

Table 1 shows that the vehicle transmission oil seal of the present invention has a rotating torque at least 10% (25% at the maximum) lower than that of a conventional vehicle transmission oil seal. Accordingly, the vehicle transmission oil seal of the present invention is excellent in the sliding properties.

EXPLANATION OF SYMBOLS

10 Transmission
11 Vehicle transmission oil seal
12 Elastic member
13 Main lip portion
14 Fitting portion
16 Metallic ring
17 Ring spring
20 Housing
21 Axle
22 Main shaft (Input shaft)
23 Counter shaft (Output shaft)
30 Seal lip portion
31 Projecting portions
50 Oil seal torque tester
51 Transmission oil seal for measurement
52 Housing
53 Bearing
54 Shaft
55 Oil seal
56 Load cell
57 Oil seal holding member
59 Housing

The invention claimed is:

1. A vehicle transmission oil seal comprising:
an elastic member with a seal lip portion having at least a main lip portion,
wherein the elastic member is formed of a composition containing a fluororubber and a fluororesin and has projecting portions at least on a surface of the main lip portion, the projecting portions being substantially formed of the fluororesin contained in the composition and having an average diameter of 5 to 20 μm,
the fluororesin is a copolymer including a polymerization unit derived from ethylene and a polymerization unit derived from tetrafluoroethylene and has a melting point of 120° C. to 340° C.,
the fluororubber is a polymer including a polymerization unit derived from vinylidene fluoride, and
a ratio ($P_{IR0.5}1/P_{IR0.5}2$) of a characteristic absorption peak ($P_{IR0.5}1$) by IR analysis derived from the fluororubber at a depth of 0.5 μm from the surface of the main lip portion to a peak ($P_{IR0.5}2$) derived from the fluororesin at the depth of 0.5 μm is smaller than a ratio ($P_{IR1.2}1/P_{IR1.2}2$) at a depth of 1.2 μm.

2. The vehicle transmission oil seal according to claim 1, wherein the fluororubber is a copolymer including:
a polymerization unit derived from vinylidene fluoride; and
a polymerization unit derived from at least one monomer selected from the group consisting of tetrafluoroethylene, hexafluoropropylene, and perfluoro(alkyl vinyl ether).

3. The vehicle transmission oil seal according to claim 2, wherein the composition has a mass ratio of the fluororubber to the fluororesin of 60/40 to 97/3.

4. The vehicle transmission oil seal according to claim 2, wherein the projecting portions has an average height of 0.5 to 5 μm.

5. The vehicle transmission oil seal according to claim 2, wherein the proportion of an area of the projecting portions on the surface of the main lip portion is not less than 10%.

6. The vehicle transmission oil seal according to claim 1, wherein the composition has a mass ratio of the fluororubber to the fluororesin of 60/40 to 97/3.

7. The vehicle transmission oil seal according to claim 6, wherein the projecting portions has an average height of 0.5 to 5 μm.

8. The vehicle transmission oil seal according to claim 6, wherein the proportion of an area of the projecting portions on the surface of the main lip portion is not less than 10%.

9. The vehicle transmission oil seal according to claim 1, wherein the projecting portions has an average height of 0.5 to 5 μm.

10. The vehicle transmission oil seal according to claim 9, wherein the proportion of an area of the projecting portions on the surface of the main lip portion is not less than 10%.

11. The vehicle transmission oil seal according to claim 1, wherein the proportion of an area of the projecting portions on the surface of the main lip portion is not less than 10%.

12. The vehicle transmission oil seal according to claim 1, wherein the diameter of the projecting portions is defined in a plane parallel with the surface of the main lip portion.

* * * * *